Oct. 23, 1962   J. L. COMEAU ET AL   3,059,252
KITCHEN UTENSIL
Filed Oct. 10, 1960
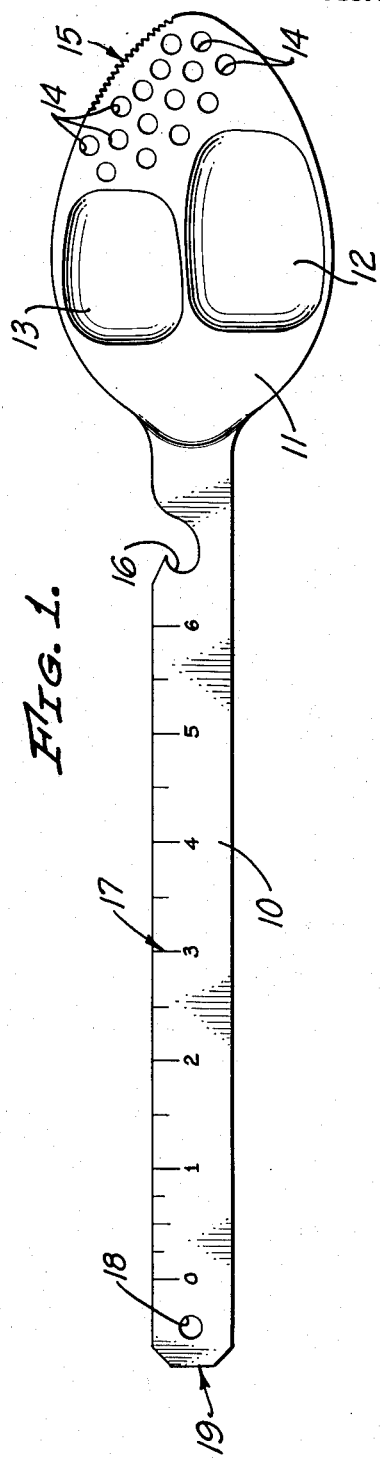
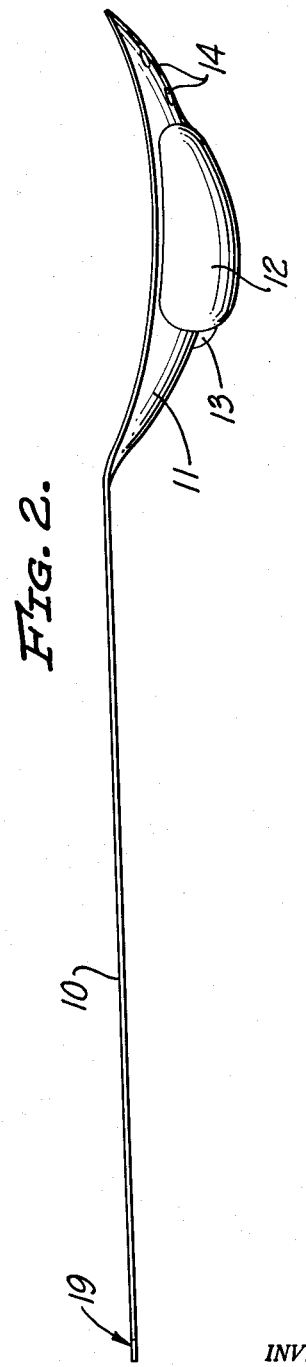
INVENTORS
JOSEPH L. COMEAU,
MARY S. COMEAU
BY *Herbert C. Schafer*
ATTORNEY

United States Patent Office 3,059,252
Patented Oct. 23, 1962

3,059,252
KITCHEN UTENSIL
Joseph L. Comeau and Mary S. Comeau, both of 2265 E. Amado Road, Palm Springs, Calif.
Filed Oct. 10, 1960, Ser. No. 61,614
1 Claim. (Cl. 7—14.1)

This invention relates generally to kitchen utensils and more particularly to a new and improved utensil combining several features.

Professional cooks as well as housewives have constantly recurring use for measuring devices such as measuring spoons; straining devices; cutting devices; ladles; and the like. For most of such uses the use is quick and temporary and immediately requires a further implement. In such cases, it would be most convenient if one implement could be used for several of such purposes.

We have further noticed that it is frequently desirable to be able to cut certain items during cooking and at the same time place a portion of the cut item into a measure to get a measured amount or to drain off liquids from such a cut item as for example meat which has been soaking in some sort of liquid.

We have devised a ladle incorporating measuring devices and a cutting and draining edge together with a bottle opener, measurer and screw driver. With this item the various portions can be used in cooperation with each other as well as independently for their independent functions.

It is a major object of this invention to provide one kitchen utensil to take the place of several utensils.

It is a further object of this invention to provide one kitchen utensil in which a cutting edge and draining area are combined to work together.

It is a further object of this invention to provide a kitchen utensil in which a cutting edge and a drainage area as well as measuring devices are combined to work together.

The foregoing and other objects and advantages of this invention will be clear to those skilled in the art by reading the following specification in conjunction with the attached drawings in which:

FIGURE 1 is a plan view of a preferred embodiment of my invention; and

FIGURE 2 is a side elevation of the same embodiment.

It will be observed that this utensil consists of a handle 10, a ladle 11 attached to one end of the handle 10; two measuring depressions impressed in the center portion of ladle 11, said measuring areas being indicated by numerals 12 and 13. These two areas may be any convenient and useful size such as 1 teaspoon for one of the measures and 1 tablespoon for the other.

A number of drain holes 14 are provided forward of the measuring areas, and a serated cutting edge 15 is provided immediately adjacent the drain holes.

A hook type of bottle opener 16 is provided on the handle as shown and a scale 17 is provided along the length of the handle for measuring purposes. Ideally this scale may be marked in inches but could be marked in any other convenient unit.

A screwdriver blade 19 is provided at the end of the handle and the hole 18 for hanging up the device is also provided in this area.

In use a person preparing foods may measure given quantities in the two measuring depressions provided in the ladle; he may use the screwdriver for prying open cans or for other such odd jobs; he may use the measuring scale for measuring as may be required from time to time and the bottle opener for its customary purposes. The serrated edge can be used in lieu of a knife for small cutting jobs; and, concurrent with the cutting, cut items may be picked up in the ladle and may be measured in the various measuring portions. In addition such cut items may be removed from liquids and the liquid drained off through the drain holes.

This item will be particularly desirable in cutting portions of food which are in boiling water and the like; and, this one instrument will cut the food and simultaneously lift it and drain away the excess liquid. When desired, at the same time, a given quantity of the cut food or liquid may be measured in the measuring areas.

It will be observed that the various portions of this utensil may be used one by one; or they may be used simultaneously and in cooperation with one another, particularly the cutting edge, draining holes, and measuring areas, so that they actually cooperate and work together.

Ideally the handle will be approximately 8 inches long with 6 inches marked off in measuring scale. Any other sizes may be used however, and this is not a limitation.

The measuring depressions on the ladle will usually be one tablespoon and one teaspoon. However, any desired measure could be built into such a ladle and for certain purposes it might be desirable to have a ladle with one teaspoon and a small measure such as a quarter of a teaspoon built in. The drainage holes will be approximately $3/16$ of an inch in diameter each, although the exact diameter is unimportant. Instead of holes, slots could also be used for this drainage purpose.

The cutting edge is shown to be serrated although if desired a mere sharp edge could be made upon this portion so that it could be used as heretofore described.

The ladle portion itself may be any convenient size so that it can acommodate the measures, etc. approximately as illustrated.

While the embodiment of our invention which has been shown and described is fully capable of performing the objects and advantages of this invention, many deviations and variations such as limiting the measuring area in the ladle to one, rather than two, and numbers of other such changes might be made without departing from the inventive concept herein disclosed. It is not our intention to be restricted by the exact embodiment shown.

We claim:

A device of the class described, comprising: a ladle and ladle handle attached thereto, said ladle having a serrated edge for cutting purposes; a series of drain apertures located immediately adjacent said cutting edge to cooperate therewith in draining liquids from the serrated edge as liquids result from cutting with said serrated edge; and dual measuring depressions in the bowl of said ladle at a position such that the said drain apertures intervene between said serrated edge and said measuring depressions so that severed materials resulting from cutting by said serrated edge may pass over said drain holes to drain liquids and then drop into one or both of said measuring depressions.

References Cited in the file of this patent

UNITED STATES PATENTS

| | | |
|---|---|---|
| 363,331 | Hammer | May 17, 1887 |
| 468,592 | Blackwell | Oct. 9, 1892 |
| 1,044,869 | Emmenegger | Nov. 19, 1912 |
| 1,601,740 | Kurzer | Oct. 5, 1926 |
| 2,296,404 | Ressegger | Sept. 22, 1942 |

FOREIGN PATENTS

| | | |
|---|---|---|
| 1,018,111 | France | Oct. 8, 1952 |